Patented Apr. 8, 1952

2,591,748

UNITED STATES PATENT OFFICE 2,591,748

AMPHOTERIC CELLULOSE DERIVATIVES

Charles L. P. Vaughan, Wilmington, Del., assignor to Hercules Powder Company, Wilmington, Del., a corporation of Delaware No Drawing. Application December 23, 1949, Serial No. 134,855

20 Claims. (Cl. 260—231)

This invention relates to new cellulose derivatives having amphoteric properties and, more particularly, to cellulose ethers containing both carboxyalkyl or sulfoalkyl and dialkylaminoalkyl groups and to the process of preparing these new products.

The preparation of alkali-soluble derivatives of cellulose is well known. However, in many applications an acid-soluble derivative is required and while attempts have repeatedly been made to prepare such acid-soluble derivatives, they have met with little success. In any case, these derivatives were soluble in either acid or alkali and not in both and so it was not possible to use them interchangeably.

Now in accordance with this invention it has been discovered that cellulose derivatives which have amphoteric properties; i. e., which are soluble in both acid and alkali, may be prepared by introducing both acidic and basic groups into cellulose. They are prepared by reacting a carboxyalkyl cellulose or a sulfoalkyl cellulose with a dialkylaminoalkyl halide in the presence of an alkaline reagent. While the carboxyalkyl or sulfoalkyl celluloses used as a starting material are alkali soluble and usually water soluble, they are not acid soluble. By the introduction of the dialkylaminoalkyl group into these compounds, in accordance with this invention, it has been found that acid solubility is imparted to them without destroying the water or alkali solubility. Thus it is possible to produce cellulose compounds which are soluble in both acid and alkali. These new amphoteric compounds may be defined as cellulose ethers containing from about 0.15 to about 1.3 dialkylaminoalkyl group per anhydroglucose unit and from about 0.1 to about 1.0 carboxyalkyl or sulfoalkyl group per anhydroglucose unit, with a minimum total substitution of 0.4 group per anhydroglucose unit. Cellulose ethers having these degrees of substitution of both basic and acidic groups are soluble in acid, water, and alkali and, accordingly, are extremely valuable in a wide variety of applications.

The following examples will illustrate the preparation of the new amphoteric cellulose derivatives containing both dialkylaminoalkyl and carboxyalkyl or sulfoalkyl groups in accordance with this invention. All parts and percentages are by weight unless otherwise indicated.

Example 1

Three parts of the sodium salt of a carboxyethyl cellulose having a degree of substitution of 0.43 (base weight of 203) were dissolved in 93 parts of a 40% aqueous solution of trimethylbenzyl ammonium hydroxide (15 moles per base weight) and the temperature of the solution was adjusted to 35°–40° C. Diethylaminoethyl bromide hydrobromide (15.4 parts, which was equivalent to 4 moles per base weight) was then added and the reaction continued at that temperature for 4 hours. The product was precipitated by adding a 7:3 mixture of acetone and methanol, separated by filtration, washed with the mixed solvent, and then with acetone, and was finally dried at 50° C. in vacuo. The carboxyethyl diethylaminoethyl cellulose so obtained amounted to 4.00 parts and contained 3.51% nitrogen, which indicated a diethylaminoethyl substitution of 0.70. This product was completely soluble in water, 10% hydrochloric acid, 20% acetic acid, and 5% sodium hydroxide. It will dissolve in methanol to form thixotropic solutions.

Example 2

Three parts of the sodium salt of sulfoethyl cellulose having a degree of substitution of 0.32 (base weight of 204) were dissolved in 92 parts of a 40% aqueous solution of trimethylbenzyl ammonium hydroxide (15 moles per base weight). Diethylaminoethyl bromide hydrobromide (15.4 parts, which was equivalent to 4 moles per base weight) was added and the reaction mixture heated to 35°–40° C. for 4 hours. The product was precipitated, washed, and dried, as described in the foregoing example. The product so obtained contained 3.60% nitrogen and 3.1% sulfur which corresponds to a diethylaminoethyl substitution of 0.70 and a sulfoethyl substitution of 0.25. The sulfoethyl diethylaminoethyl cellulose was completely soluble in water, dilute acids and dilute alkali. It will dissolve in methanol to form thixotropic solutions.

Example 3

Two parts of a carboxymethylcellulose having a degree of substitution of 0.7 (base weight of 218) were dissolved in 40 parts of a 15% aqueous solution of trimethylbenzyl ammonium hydroxide (4.16 moles per base weight) and the temperature of the solution was adjusted to 35°–40° C. Diethylaminoethyl chloride hydrochloride (4.74 parts which was equivalent to 3 moles per base weight) was then added and the reaction mixture was agitated and held at 35°–40° C. for 4 hours. The product was precipitated by adding a 7:3 mixture of acetone and methanol, separated by filtration, washed with the mixed solvent, and then with acetone and finally with hexane, and then was dried at 60° C. in vacuo. The carboxymethyl diethylaminoethyl celluose so obtained was analyzed and found to contain 1.99% nitrogen which corresponds to a degree of substitution of 0.35 diethylaminoethyl groups. This product was completely soluble in dilute acids, water, and dilute alkali to form in each case viscous fiber-free solutions.

*Example 4*

Two parts of a sulfoethyl cellulose having a degree of substitution of 0.32 and a base weight of 204 were suspended in 100 parts of dioxane and 12 parts of a 20% aqueous solution of sodium hydroxide (6 moles per base weight) were added. The slurry was heated at 90° C. for one hour and then 6.75 parts of diethylaminoethyl chloride hydrochloride (4 moles per base weight) were added. The reaction mixture was agitated and refluxed for 4 hours. The gummy product which was obtained was separated from the solvent, dissolved in 20% acetic acid, and then reprecipitated by pouring the acetic acid solution into a 7:3 mixture of acetone and isopropyl alcohol. It was then washed with an aqueous solution of ethanol and acetone, then with anhydrous acetone, and then hexane and finally was dried in vacuo at 60° C. The diethylaminoethyl sulfoethyl cellulose so obtained had a degree of substitution of 0.39 diethylaminoethyl group and was soluble in water, dilute acids, dilute alkalies, and methanol, giving clear, viscous solutions in each case.

*Example 5*

Two parts of carboxymethylcellulose having a degree of substitution of 0.7 (base weight of 218) were dissolved in a 15.5% aqueous solution of trimethylbenzyl ammonium hydroxide (4.2 moles per base weight) and 3.9 parts of dimethylaminoethyl chloride hydrochloride (3 moles per base weight) were added. The reaction mixture was agitated and heated at 48° C. for 2 hours. The product was precipitated by adding a 7:3 mixture of acetone and methanol, separated by filtration, washed with the mixed solvent, then with acetone and with hexane, and finally was dried at 60° C. in vacuo. The carboxymethyl diethylaminoethyl cellulose so obtained was soluble in 20% acetic acid, water, and 10% sodium hydroxide and contained 0.31 diethylaminoethyl group per anhydroglucose unit.

*Example 6*

Two parts of a carboxymethylcellulose having a degree of substitution of 0.30 and a base weight of 186 were suspended in 100 parts of dioxane and 12.9 parts of a 20% aqueous solution of sodium hydroxide (6 moles per base weight) were added. The slurry was heated at 90° C. for one hour and then 7.4 parts of diethylaminoethyl chloride hydrochrolide (4 moles per base weight) were added. The reaction mixture was agitated and refluxed (90° C.) for 4 hours. The gummy product which was obtained was separated from the solvent, dissolved in 20% acetic acid, and then reprecipitated by pouring the acetic acid solution into an acetone-methanol solution. It was then washed with an aqueous solution of methanol and acetone, then with anhydrous acetone, followed by hexane and finally was dried in vacuo at 60° C. The diethylaminoethyl carboxymethylcellulose so obtained was soluble in water, dilute acids, and dilute alkalies, giving clear, viscous solutions in each case. It had a degree of substitution of 0.36 diethylaminoethyl group.

In accordance with this invention amphoteric cellulose derivatives may be prepared by the dialkylaminoalkylation of carboxyalkyl or sulfoalkyl celluloses whereby cellulose ethers are produced containing at least about 0.15 dialkylaminoalkyl and at least about 0.1 carboxyalkyl or sulfoalkyl groups per anhydroglucose unit, the total substitution being about 0.4 group per anhydroglucose unit. The dialkylaminoalkylation is carried out by reacting a dialkylaminoalkyl halide with carboxyalkyl or sulfoalkyl cellulose. The reaction may be represented as follows:

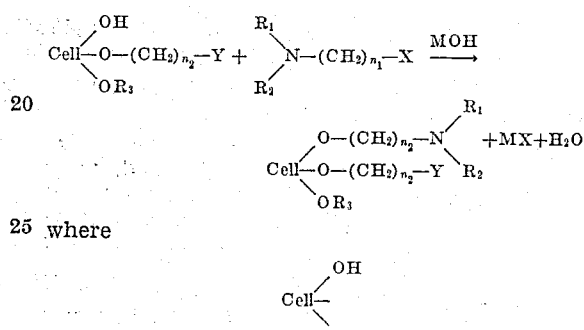

where $$Cell\begin{matrix}-OH\\ -\end{matrix}$$

represents an etherifiable hydroxyl group, Y is a sulfo or carboxy group or a salt thereof, $R_1$ and $R_2$ are alkyl radicals, X is a halogen, $n_1$ is an integer of from 2 to 4, $n_2$ is an integer of from 1 to 3, $R_3$ is hydrogen, alkyl, or hydroxyalkyl, and MOH is a strongly alkaline hydroxide.

The reaction between the carboxyalkyl or sulfoalkyl cellulose and the dialkylaminoalkyl halide may be carried out by either a solution or fibrous process. When a solution process is used, the reaction between the carboxyalkyl or sulfoalkyl cellulose and the dialkylaminoalkyl halide is preferably carried out in the presence of a quaternary ammonium hydroxide. In this case the cellulose derivative is dissolved or dispersed in an aqueous solution of the quaternary ammonium hydroxide by agitating a mixture of the two at room temperature or, if necessary, at slightly elevated temperatures, and the solution is then treated with the dialkylaminoalkyl halide. The concentration of the aqueous solution of the quaternary ammonium hydroxide will depend upon the hydroxide utilized. Any quaternary ammonium hydroxide may be used to bring about the reaction between the carboxyalkyl or sulfoalkyl cellulose and the dialkylaminoalkyl halide. Particularly suitable quaternary ammonium hydroxides are the trialkyl aralkyl ammonium hydroxides such as trimethylbenzyl, triethylbenzyl ammonium hydroxides, etc., dialkyl diaralkyl quaternary ammonium hydroxides such as dimethyl dibenzyl, diethyl dibenzyl quaternary ammonium hydroxides, etc. The reaction between the carboxyalkyl or sulfoalkyl cellulose and the dialkylaminoalkyl halide in the solution process is carried out at a temperature of from about 25° C. to about 50° C. and preferably at a temperature of from about 35° C. to about 45° C. for about 1 to 8 hours depending upon the reactivity of the dialkylaminoalkylation reagent.

The dialkylaminoalkyl ether of the carboxyalkyl or sulfoalkyl cellulose which is obtained as a product of the above homogeneous or semi-homogeneous etherification reaction may be isolated by the addition of a suitable organic solvent in order to precipitate the product. The precipitating solvent should be one that will dissolve the organic base and excess alkylating agent but in which the cellulosic derivative is not soluble. Suitable organic solvents for this precipitation are alcohols in which the product is not soluble, or mixed solvents such as a mixture of acetone and an alcohol.

The reaction between the carboxyalkyl or sulfoalkyl cellulose and the dialkylaminoalkyl halide may also be carried out by a fibrous or slurry process. In this case the carboxyalkyl or sulfoalkyl cellulose is suspended in an inert organic solvent. Any organic solvent may be used as the medium for this dialkylaminoalkylation reaction, provided that it is inert under the reaction conditions; that is, that it does not react with the dialkylaminoalkyl halide or the carboxyalkyl or sulfoalkyl cellulose. Suitable organic solvents which may be used for the reaction are dioxane, isopropanol, tertiary butanol, tetrahydrofuran, and ethylene glycol diethyl ether. Best results are obtained with organic solvents which are water soluble such as dioxane, tertiary butanol, etc. In these media water cannot accumulate in the cellulose derivative phase of the reaction mixture. However, the dialkylaminoalkylation reaction may be satisfactorily carried out in such water-insoluble organic solvents as benzene, toluene, etc. The amount of solvent used is determined by the type of agitation available for the heterogeneous reaction since mixing becomes increasingly difficult with increasing proportions of the cellulose compound. Any strongly alkaline hydroxide may be used to carry out the dialkylaminoalkylation reaction by the fibrous process. Suitable alkaline reagents which may be used are the alkali metal hydroxides such as sodium or potassium hydroxide, or any of the quaternary ammonium hydroxides described above for use in the solution process. The fibrous process is usually carried out at a temperature of from about 35° C. to about 125° C. In general, a higher temperature is used when the alkaline reagent is an alkali hydroxide as, for example, a temperature of from about 70° C. to 125° C. and preferably from about 80° C. to about 110° C. Lower temperatures as, for example, from about 35° C. to about 45° C. may be used when the alkaline reagent is a quaternary ammonium salt. If the particular solvent being used as the diluent in the reaction has a boiling point below this temperature range, the reaction may be carried out under pressure. Usually the temperature of the suspension of carboxyalkyl or sulfoalkyl cellulose and the alkaline reagent in the solvent is adjusted to the reaction temperature prior to the addition of the dialkylaminoalkyl halide. Following the addition of the etherification reagent the reaction is allowed to proceed at the specified temperature for about 1 to about 6 hours. Longer reaction times may be used, but it is believed that no advantages are realized from reaction times of greater than about 6 hours.

The carboxyalkyl or sulfoalkyl dialkylaminoalkyl cellulose, when prepared according to this slurry or fibrous process, is readily isolated from the reaction mixture by filtration or any other convenient means of separating the liquid from the product. It may then be purified by washing to remove the alkaline reagent and any unreacted dialkylaminoalkyl halide. Any convenient solvent for this washing operation may be used, which solvent will not dissolve the cellulosic derivative but which will dissolve the dialkylaminoalkyl halide and the alkaline reagent. An aqueous ethanol-acetone solution or isopropanol-acetone solution followed by anhydrous acetone and then hexane is a convenient washing procedure. The fibrous product may then be dried by any desirable means.

Any carboxyalkyl cellulose having a degree of substitution of at least 0.1 carboxyalkyl group per anhydroglucose unit may be used as the starting material for the preparation of carboxyalkyl dialkylaminoalkyl celluloses in accordance with this invention. In like manner any sulfoalkyl cellulose containing at least 0.1 sulfoalkyl group per anhydroglucose unit may be used for the preparation of the sulfoalkyl dialkylaminoalkyl celluloses in accordance with this invention. In either case the alkyl radical of the carboxyalkyl or sulfoalkyl groups should contain no more than 3 carbon atoms since those derivatives in which the alkyl radical contains more than 3 carbon atoms do not yield, on dialkylaminoalkylation, products which are soluble in both acid and alkali. Suitable starting materials are then such products as carboxymethylcellulose, carboxyethylcellulose, carboxypropylcellulose, sulfomethylcellulose, sulfoethylcellulose, and sulfopropylcellulose. In addition to the carboxyalkyl or sulfoalkyl substituent, these starting materials may also contain other substituent groups such as hydroxyethyl, etc. or methyl, ethyl, etc. groups, provided that such a derivative also contains free etherifiable hydroxyl radicals which can undergo the dialkylaminoalkylation reaction. The carboxyalkyl or sulfoalkyl cellulose may be used in the form of the free acid or as an alkali metal or ammonium salt thereof. In the latter case less of the alkaline reagent used to bring about the dialkylaminoalkylation is required. If the free acid is used, an excess of the alkaline reagent must be used in order to neutralize the acid group.

The dialkylaminoalkyl halides which may be reacted with the cellulosic compound may be defined as those having the general formula $$R_1R_2N\text{---}(CH_2)_n\text{---}X$$

where $R_1$ and $R_2$ may be any alkyl radical such as methyl, ethyl, propyl, isopropyl, butyl, isobutyl, etc., $R_1$ and $R_2$ may be alike or different, and $n$ is an integer of from 2 to 4; that is, the dialkylaminoalkyl halide may be a dialkylaminoethyl, aminopropyl, or aminobutyl halide. The solubility of the product decreases as $n$ increases and consequently to produce an acid-soluble product, $n$ should not exceed 4. In the same way, as the length of $R_1$ and $R_2$ increases, the solubility of the product decreases and accordingly they will preferably contain not more than 4 carbon atoms or a maximum of 8 carbon atoms for the two radicals. X may be any halide, that is, chlorine, bromine, or iodine. The dialkylaminoalkylation reagent may be used in the form of the free base or the salt thereof as, for example, the hydrohalide salts such as diethylaminoethyl chloride hydrochloride, diethylaminoethyl bromide hydrobromide, etc. The amount of the dialkylaminoalkyl halide which is reacted with the carboxyalkyl or sulfoalkyl cellulose will depend upon the degree of substitution desired, reactivity of the reagent, etc. In order for the product to contain at least 0.15 dialkylaminoalkyl group per anhydroglucose unit an amount of dialkylaminoalkyl halide equal to from about 0.5 mole to about 1 mole per anhydroglucose unit of the carboxyalkyl or sulfoalkyl cellulose is added. Larger amounts may be used whereby a higher degree of substitution is obtained.

As pointed out above, the new amphoteric cellulose derivatives of this invention should contain at least about 0.1 carboxyalkyl or sulfoalkyl group and at least about 0.15 dialkylaminoalkyl group per anhydroglucose unit with a total minimum substitution of 0.4 group per anhydroglucose unit in order for the compound to exhibit both acid and alkali solubility. These new carboxyalkyl dialkylaminoalkyl celluloses and sulfoalkyl dialkylaminoalkyl celluloses will preferably contain from about 0.1 to about 1.0 and more preferably from about 0.3 to about 0.7 of the carboxyalkyl or sulfoalkyl group and from about 0.15 to about 1.3 and more preferably from about 0.3 to about 0.7 dialkylaminoalkyl group per anhydroglucose unit.

The new cellulose derivatives of this invention having amphoteric properties may be used in a wide variety of applications, particularly in such uses requiring a viscous solution of a wide pH range. They are particularly valuable for use in adhesives, thickeners, textile sizes, and as foam stabilizers.

What I claim and desire to protect by Letters Patent is:

1. An amphoteric cellulose compound consisting of a cellulose ether containing at least about 0.15 dialkylaminoalkyl group per anhydroglucose unit and at least about 0.1 of an acidic group per anhydroglucose unit, the total of these groups amounting to a substitution of at least about 0.4 per anhydroglucose unit, said cellulose ether having the formula

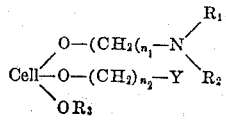

where $R_1$ and $R_2$ are alkyl radicals containing from 1 to 4 carbon atoms, $n_1$ is an integer of from 2 to 4, $n_2$ is an integer of from 1 to 3, Y is an acidic group selected from sulfo and carboxy groups, and $R_3$ is one of the group consisting of hydrogen, alkyl, and hydroxyalkyl.

2. An amphoteric cellulose compound consisting of a cellulose ether containing from about 0.15 to about 1.3 dialkylaminoalkyl groups per anhydroglucose unit and from about 0.1 to about 1.0 of an acidic group per anhydroglucose unit, the total of these groups amounting to a substitution of at least about 0.4 per anhydroglucose unit, said cellulose ether having the formula

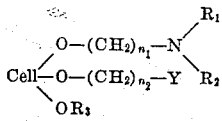

where $R_1$ and $R_2$ are alkyl radicals containing from 1 to 4 carbon atoms, $n_1$ is an integer of from 2 to 4, $n_2$ is an integer of from 1 to 3, Y is an acidic group selected from sulfo and carboxy groups, and $R_3$ is one of the group consisting of hydrogen, alkyl, and hydroxyalkyl.

3. An amphoteric cellulose compound consisting of a cellulose ether containing from about 0.15 to about 1.3 dialkylaminoalkyl groups per anhydroglucose unit and from about 0.1 to about 1.0 carboxyalkyl group per anhydroglucose unit, the total of these groups amounting to a substitution of at least about 0.4 per anhydroglucose unit, said cellulose ether having the formula

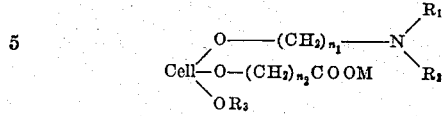

where $R_1$ and $R_2$ are alkyl radicals containing from 1 to 4 carbon atoms, $n_1$ is an integer of from 2 to 4, $n_2$ is an integer of from 1 to 3, M is one of the group of hydrogen and alkali metal, and $R_3$ is one of the group consisting of hydrogen, alkyl, and hydroxyalkyl.

4. An amphoteric cellulose compound consisting of a cellulose ether containing from about 0.15 to about 1.3 dialkylaminoalkyl groups per anhydroglucose unit and from about 0.1 to about 1.0 sulfoalkyl group per anhydroglucose unit, the total of these groups amounting to a substitution of at least about 0.4 per anhydroglucose unit, said cellulose ether having the formula

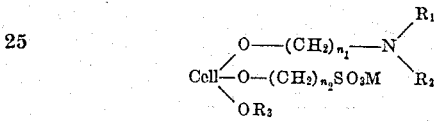

where $R_1$ and $R_2$ are alkyl radicals containing from 1 to 4 carbon atoms, $n_1$ is an integer of from 2 to 4, $n_2$ is an integer of from 1 to 3, M is one of the group of hydrogen and alkali metal, and $R_3$ is one of the group consisting of hydrogen, alkyl, and hydroxyalkyl.

5. Amphoteric cellulose compound consisting of a cellulose ether containing from about 0.3 to about 0.7 dialkylaminoalkyl group per anhydroglucose unit and from about 0.3 to about 0.7 of an acidic group per anhydroglucose unit, said cellulose ether having the formula

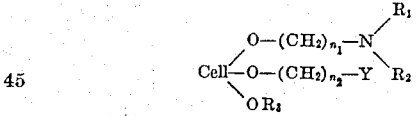

where $R_1$ and $R_2$ are alkyl radicals containing from 1 to 4 carbon atoms, $n_1$ is an integer of from 2 to 4, $n_2$ is an integer of from 1 to 3, Y is an acidic group selected from sulfo and carboxy groups, and $R_3$ is one of the group consisting of hydrogen, alkyl, and hydroxyalkyl.

6. An amphoteric cellulose compound consisting of a cellulose ether containing from about 0.3 to about 0.7 dialkylaminoalkyl group per anhydroglucose unit and from about 0.3 to about 0.7 carboxyalkyl group per anhydroglucose unit, said cellulose ether having the formula

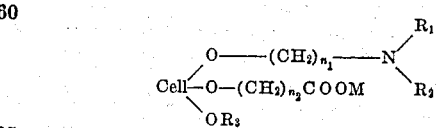

where $R_1$ and $R_2$ are alkyl radicals containing from 1 to 4 carbon atoms, $n_1$ is an integer of from 2 to 4, $n_2$ is an integer of from 1 to 3, M is one of the group of hydrogen and alkali metal, and $R_3$ is one of the group consisting of hydrogen, alkyl, and hydroxyalkyl.

7. An amphoteric cellulose campound consisting of a cellulose ether containing from about 0.3 to about 0.7 dialkylaminoalkyl group per anhydroglucose unit and from about 0.3 to about 0.7 sulfoalkyl group per anhydroglucose unit, said cellulose ether having the formula

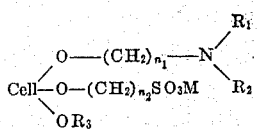

where $R_1$ and $R_2$ are alkyl radicals containing from 1 to 4 carbon atoms, $n_1$ is an integer of from 2 to 4, $n_2$ is an integer of from 1 to 3, M is one of the group of hydrogen and alkali metal, and $R_3$ is one of the group consisting of hydrogen, alkyl, and hydroxyalkyl.

8. An amphoteric cellulose compound consisting of a cellulose ether containing from about 0.3 to about 0.7 dialkylaminoalkyl group per anhydroglucose unit and from about 0.3 to about 0.7 carboxymethyl group per anhydroglucose unit, said cellulose ether having the formula

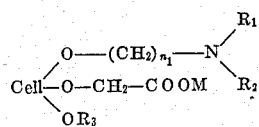

where $R_1$ and $R_2$ are alkyl radicals containing from 1 to 4 carbon atoms, $n_1$ is an integer of from 2 to 4, M is one of the group of hydrogen and alkali metal, and $R_3$ is one of the group consisting of hydrogen, alkyl, and hydroxyalkyl.

9. An amphoteric cellulose compound consisting of a cellulose ether containing from about 0.3 to about 0.7 dialkylaminoalkyl group per anhydroglucose unit and from about 0.3 to about 0.7 carboxyethyl group per anhydroglucose unit, said cellulose ether having the formula

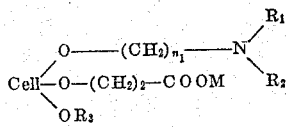

where $R_1$ and $R_2$ are alkyl radicals containing from 1 to 4 carbon atoms, $n_1$ is an integer of from 2 to 4, M is one of the group of hydrogen and alkali metal, and $R_3$ is one of the group consisting of hydrogen, alkyl, and hydroxyalkyl.

10. An amphoteric cellulose compound consisting of a cellulose ether containing from about 0.3 to about 0.7 dialkylaminoalkyl group per anhydroglucose unit and from about 0.3 to about 0.7 sulfoethyl group per anhydroglucose unit, said cellulose ether having the formula

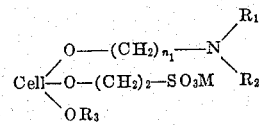

where $R_1$ and $R_2$ are alkyl radicals containing from 1 to 4 carbon atoms, $n_1$ is an integer of from 2 to 4, M is one of the group of hydrogen and alkali metal, and $R_3$ is one of the group consisting of hydrogen, alkyl, and hydroxyalkyl.

11. An amphoteric cellulose compound consisting of a cellulose ether containing from about 0.3 to about 0.7 diethylaminoethyl group and from about 0.3 to about 0.7 carboxymethyl group per anhydroglucose unit.

12. An amphoteric cellulose compound consisting of a cellulose ether containing from about 0.3 to about 0.7 diethylaminoethyl group and from about 0.3 to about 0.7 carboxyethyl group per anhydroglucose unit.

13. An amphoteric cellulose compound consisting of a cellulose ether containing from about 0.3 to about 0.7 diethylaminoethyl group and from about 0.3 to about 0.7 sulfoethyl group per anhydroglucose unit.

14. An amphoteric cellulose compound consisting of a cellulose ether containing from about 0.3 to about 0.7 dimethylaminoethyl group and from about 0.3 to about 0.7 carboxymethyl group per anhydroglucose unit.

15. The process of preparing an amphoteric cellulose compound which comprises reacting a cellulosic compound, selected from the group consisting of carboxyalkyl celluloses and sulfoalkyl celluloses wherein the alkyl radical contains from 1 to 3 carbon atoms, said cellulosic compound containing etherifiable hydroxyl radicals and at least 0.1 of said substituent groups per anhydroglucose unit, with a dialkylaminoalkyl halide in the presence of an alkaline reagent, said dialkylaminoalkyl halide having the formula $$R_1R_2N-(CH_2)_n-X$$

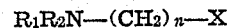

where $R_1$ and $R_2$ are alkyl radicals, $n$ is an integer of from 2 to 4, and X is a halogen.

16. The process of preparing an amphoteric cellulose compound which comprises reacting a cellulosic compound, selected from the group consisting of carboxyalkyl celluloses and sulfoalkyl celluloses wherein the alkyl radical contains from 1 to 3 carbon atoms, said cellulosic compound containing etherifiable hydroxyl radicals and from about 0.1 to about 1.0 of said substituent groups per anhydroglucose unit, with a dialkylaminoalkyl halide in the presence of an alkaline reagent, said dialkylaminoalkyl halide having the formula $$R_1R_2N-(CH_2)_n-X$$

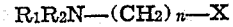

where $R_1$ and $R_2$ are alkyl radicals, $n$ is an integer of from 2 to 4, and X is a halogen.

17. The process of preparing an amphoteric cellulose compound which comprises reacting a carboxyalkyl cellulose having a degree of substitution of from about 0.1 to about 1.0 and in which the alkyl group contains from 1 to 3 carbon atoms, with a dialkylaminoalkyl halide in the presence of an alkaline reagent, said dialkylaminoalkyl halide having the formula $$R_1R_2N-(CH_2)_n-X$$

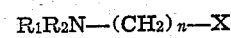

where $R_1$ and $R_2$ are alkyl radicals, $n$ is an integer of from 2 to 4, and X is a halogen.

18. The process of preparing an amphoteric cellulose compound which comprises reacting a sulfoalkyl cellulose having a degree of substitution of from about 0.1 to about 1.0 and in which the alkyl group contains from 1 to 3 carbon atoms, with a dialkylaminoalkyl halide in the presence of an alkaline reagent, said dialkylaminoalkyl halide having the formula $$R_1R_2N-(CH_2)_n-X$$

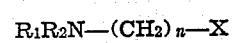

where $R_1$ and $R_2$ are alkyl radicals, $n$ is an integer of from 2 to 4, and X is a halogen.

19. The process of preparing an amphoteric cellulose compound which comprises reacting a carboxyalkyl cellulose having a degree of substitution of from about 0.3 to about 0.7 and in which the alkyl group contains from 1 to 3 carbon atoms, with a dialkylaminoalkyl halide in the presence of an alkaline reagent, said dialkylaminoalkyl halide having the formula $$R_1R_2N-(CH_2)_n-X$$

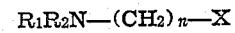

where $R_1$ and $R_2$ are alkyl radicals, $n$ is an integer of from 2 to 4, and X is a halogen.

20. The process of preparing an amphoteric cellulose compound which comprises reacting a sulfoalkyl cellulose having a degree of substitution of from about 0.3 to about 0.7 and in which the alkyl group contains from 1 to 3 carbon atoms, with a dialkylaminoalkyl halide in the presence of an alkaline reagent, said dialkylaminoalkyl halide having the formula $$R_1R_2N\!\!-\!\!(CH_2)_n\!\!-\!\!X$$

where $R_1$ and $R_2$ are alkyl radicals, $n$ is an integer of from 2 to 4, and X is a halogen.

CHARLES L. P. VAUGHAN.

REFERENCES CITED

The following references are of record in the file of this patent:

UNITED STATES PATENTS

| Number | Name | Date |
|---|---|---|
| 2,136,296 | Hardy | Nov. 8, 1938 |
| 2,476,331 | Swinehart et al. | July 19, 1949 |